United States Patent
Pearce et al.

(10) Patent No.: US 10,520,050 B2
(45) Date of Patent: Dec. 31, 2019

(54) METHOD AND APPARATUS FOR POWER-SAVING, FAIL-SAFE CONTROL OF AN ELECTROMECHANICAL BRAKE

(71) Applicant: KOLLMORGEN CORPORATION, Radford, VA (US)

(72) Inventors: Robert Pearce, Bristol (GB); George B. Yundt, Andover, MA (US); Daniel Kouba, Santa Barbara, CA (US)

(73) Assignee: KOLLMORGEN CORPORATION, Radford, VA (US)

( * ) Notice: Subject to any disclaimer, the term of this patent is extended or adjusted under 35 U.S.C. 154(b) by 0 days.

(21) Appl. No.: 15/411,759

(22) Filed: Jan. 20, 2017

(65) Prior Publication Data

US 2017/0211640 A1    Jul. 27, 2017

Related U.S. Application Data

(60) Provisional application No. 62/286,345, filed on Jan. 23, 2016.

(51) Int. Cl.
*F16D 63/00* (2006.01)
*H01F 7/06* (2006.01)
(Continued)

(52) U.S. Cl.
CPC ........... *F16D 63/002* (2013.01); *H01F 7/064* (2013.01); *H02P 3/04* (2013.01); *F16D 2121/20* (2013.01)

(58) Field of Classification Search
CPC ......... B66B 29/00; E21B 47/182; H02P 3/16; B25J 13/025; B25J 18/00
See application file for complete search history.

(56) References Cited

U.S. PATENT DOCUMENTS 3,687,235 A * 8/1972 Mitsui .................... B66B 1/285
                                                          187/296
5,592,071 A * 1/1997 Brown ..................... G05F 1/62
                                                          323/224
(Continued)

FOREIGN PATENT DOCUMENTS

CN    104210982 A2    12/2014
DE    19739736 A1    3/1999
(Continued)

OTHER PUBLICATIONS

Translation of WO2010057605 has been attached.*
(Continued)

*Primary Examiner* — Bickey Dhakal
*Assistant Examiner* — Zoheb S Imtiaz
(74) *Attorney, Agent, or Firm* — Day Pitney LLP

(57) ABSTRACT

A control circuit configured to control an electromechanical brake is provided. The control circuit includes: a switching regulator configured to control a magnitude of voltage applied to a brake coil of the electromechanical brake; wherein said switching regulator includes at least one semiconductor switch, one diode, one capacitor and one inductor; the control circuit is configured such that, in operation, at least one signal from a process sub-system specifies the magnitude of the voltage for the brake coil; and at least one brake applying control signal from a safety sub-system can cause the brake coil voltage to be reduced to a level low enough to apply the brake by opening a switch and each brake applying control signal from the safety sub-system has a corresponding diagnostic feedback signal to the safety sub-system that indicates the state of the corresponding switch. A method and a system are disclosed.

14 Claims, 10 Drawing Sheets

(51) Int. Cl.
*H02P 3/04* (2006.01)
*H02P 29/04* (2006.01)
*F16D 121/20* (2012.01)

(56) References Cited

U.S. PATENT DOCUMENTS

| | | | | |
|---|---|---|---|---|
| 6,039,151 | A * | 3/2000 | Ringel | B66B 5/028 |
| | | | | 187/207 |
| 6,285,146 | B1 * | 9/2001 | Harlan | H02P 6/10 |
| | | | | 318/400.04 |
| 6,426,633 | B1 | 7/2002 | Thybo | |
| 6,486,674 | B2 | 11/2002 | Groenewold et al. | |
| 6,487,695 | B1 | 11/2002 | Kranitzky | |
| 6,591,217 | B1 | 7/2003 | Baur et al. | |
| 7,019,474 | B2 * | 3/2006 | Rice | H02M 5/297 |
| | | | | 318/400.26 |
| 7,309,972 | B2 | 12/2007 | Kranitzky et al. | |
| 7,705,492 | B2 | 4/2010 | Pullmann et al. | |
| 7,737,652 | B2 | 6/2010 | Schwesig | |
| 8,432,140 | B1 * | 4/2013 | Deutscher | H02M 3/158 |
| | | | | 323/222 |
| 8,585,158 | B2 | 11/2013 | Gewinner et al. | |
| 2007/0272491 | A1 * | 11/2007 | Kattainen | B66B 1/32 |
| | | | | 187/288 |
| 2009/0125760 | A1 | 5/2009 | Schlette | |
| 2014/0125149 | A1 | 5/2014 | Matsumoto et al. | |
| 2014/0210439 | A1 * | 7/2014 | Chiu | H02J 7/0065 |
| | | | | 323/274 |
| 2014/0333268 | A1 * | 11/2014 | Schroeder | H02P 15/00 |
| | | | | 322/21 |
| 2014/0354199 | A1 * | 12/2014 | Zeng | H02P 7/29 |
| | | | | 318/400.3 |
| 2015/0340973 | A1 * | 11/2015 | Dolfi | B60T 7/12 |
| | | | | 318/372 |
| 2016/0116925 | A1 * | 4/2016 | Freeman | H02M 3/33546 |
| | | | | 307/130 |
| 2016/0336854 | A1 * | 11/2016 | Thornton | H02M 3/158 |
| 2017/0099011 | A1 * | 4/2017 | Freeman | H02M 7/06 |
| 2018/0131411 | A1 * | 5/2018 | Floresca | H02J 50/10 |

FOREIGN PATENT DOCUMENTS

| | | |
|---|---|---|
| DE | 19927851 A1 | 1/2001 |
| EP | 0658832 B1 | 4/2000 |
| EP | 0742499 B1 | 9/2001 |
| EP | 1311047 A2 | 5/2003 |
| WO | 2005047157 A2 | 5/2005 |
| WO | 2010057605 A1 | 5/2010 |
| WO | WO2010057605 * | 5/2010 |

OTHER PUBLICATIONS

International Search Report and International Written Opinion issued in corresponding international application No. PCT/US2017/014393, dated May 4, 2017.

PROFIBUS International, PROFIsafe Brochure, PROFIBUS, V1.11, 2001.

Tausch, W., "Interfacing Safety Fieldbus Devices with Safety Relevant Sensors and Actuators", Bernstein AG, Jan. 2003.

International Organization for Standardization, "Safety of Machinery—Safety-Related Parts of Control Systems—Part 1: General Principles for Design", reference No. ISO 13849-1, Nov. 1, 2006.

Falin, J., "Designing DC/DC Converters Based on ZETA Topology", Texas Instruments Incorporated, pp. 16-21, 2010.

International Organization for Standardization, "Safety of Machinery—Functional Safety of Safety-Related Electrical, Electronic and Programmable Electronic Control Systems", Edition 1.1, reference No. IEC 62061, Nov. 2012.

International Organization for Standardization, "Safety of Machinery—Safety of Machinery—Safety-Related Parts of Control Systems—Part 2: Validation", reference No. ISO 13849-2, Second Edition, Oct. 15, 2012.

Transmittal of International Preliminary Report on Patentability; International Preliminary Report on Patentability; and Written Opinion of the International Searching Authority issued in corresponding international application No. PCT/US2017/014393, dated Aug. 2, 2018.

* cited by examiner

METHOD AND APPARATUS FOR POWER-SAVING, FAIL-SAFE CONTROL OF AN ELECTROMECHANICAL BRAKE

CROSS REFERENCE TO RELATED APPLICATION

This application is filed under 35 U.S.C. § 111(a) and further, under 35 U.S.C. § 119(e) claims the benefit of U.S. provisional patent application Ser. No. 62/286,345, filed Jan. 23, 2016, entitled "Method and Apparatus for Power-Saving, Fail-Safe Control of an Electromechanical Brake," the entire disclosure of which is incorporated by reference herein in its entirety.

BACKGROUND OF THE INVENTION

1. Field of the Invention

This invention is directed toward braking systems for an electric motor, and in particular, to embodiments of a controller for an electro-mechanical brake that provides fail-safe control and reduced power consumption when compared to prior art systems.

2. Description of the Related Art

Rotating shafts in general and, in particular, the output shaft of a servo motor, may be fitted with an electromechanically operated brake. The optional brake permits the motor shaft to be held stationary when the motor coil is de-energized. Such a brake may also be used to bring a rotating shaft to a standstill. Electromechanically operated brakes may also be used in linear motion machines. Electromechanical brakes can greatly enhance operator safety. Thus, standards for such equipment have been adopted and include design criteria that call for high levels of performance.

Examples of industrial standards for safety of machinery include International Standard IEC 62061, entitled "Safety of machinery—Functional safety of safety-related electrical, electronic and programmable electronic control systems," Edition 1.1 2012 November, published by the International Electrotechnical Commission (IEC) of Geneva Switzerland; as well as International Standard ISO 13849-1, entitled "Safety of machinery—Safety-related parts of control systems—Part 1: General principles for design," Second edition, 2006 Nov. 1, published by the ISO (the International Organization for Standardization); and also International Standard ISO 13849-2, entitled "Safety of machinery—Safety-related parts of control systems—Part 2: Validation," Second edition, 2012 Oct. 15, published by the ISO (the International Organization for Standardization). These standards are incorporated by reference herein in their entirety.

In summary, "functional safety," as described therein, generally refers to overall safety of a system or piece of equipment that depends on the system or equipment operating correctly in response to its inputs, including the safe management of likely operator errors, hardware failures and environmental changes. The objective of functional safety is to provide freedom from unacceptable risk of physical injury or of damage to the health of people either directly or indirectly (through damage to property or to the environment). The standards for functional safety related to electrical, electronic and programmable electronic control systems have been widely adopted. Among other things, requirements are included to demonstrate safety against injury through control of the brake in a fail-safe manner, generally referred to as "Safe Brake Control."

In order to provide some context, the practice and terminology of functional safety will be briefly reviewed. The term "process sub-system" generally refers to that part of a drive not related to functional safety. "Safe Torque Off", or simply "STO," generally refers to a safety control function that prevents the generation of torque in a motor-drive sub-system. "Risk" generally refers to a combination of the probability of occurrence of harm and the severity of that harm. For a variable designation of N, "Hardware Fault Tolerance," or simply "HFT," generally means that N+1 faults could cause a loss of the safety-related control function. "Safe Failure Fraction," or simply "SFF," generally refers to a fraction of the overall failure rate of a sub-system that does not result in a dangerous failure. "Probability of dangerous Failure per Hour," or simply "$PFH_D$," generally refers to the average probability of a dangerous failure per hour of a safety related system or sub-system to perform the specified safety function. "Safety Integrity Level," or simply "SIL," generally refers to the probability of a safety control system or sub-system satisfactorily performing the required safety-related control functions under all stated conditions. IEC62061 defines three levels of SIL: SIL1 which has a $PFH_D$ in the range $\geq 10^{-6}$ to $<10^{-5}$; SIL2 which has a $PFH_D$ in the range $\geq 10^{-7}$ to $<10^{-6}$; and SIL3 which has a $PFH_D$ in the range $\geq 10^{-8}$ to $<10^{-7}$ and is also the most stringent level of SIL. Note that in addition to these $PFH_D$ requirements, each SIL also has "architectural requirements" as set out in Table 5 of IEC62061. SIL3 can be achieved with an SFF in the range 90%-<99% and HFT=1 or alternatively with a less demanding SFF in the range 60%-<90% but a more demanding HFT=2.

A first step in designing a safety system is to evaluate the risks. A second step is to determine what Safety-Related Control Function is required to mitigate each respective risk. A third step is to determine what the required SIL is for each respective Safety-Related Control Function. As an example, consider a factory using six-axis robots. The robots can cause serious injury and the production area (generally in front of the robots) must be guarded with a light curtain. When a person intrudes into the protected area, the light curtain sends a signal to a safety PLC which in turns sends a signal to the six drives in the robot which place themselves in the STO state and applies the brake safely to each respective motor. The light curtain, safety PLC and six drives form what is termed a "safety chain." That is, the overall safety function is dependent on each sub-system in the safety chain. Following the procedures described in IEC62061, it may be determined that SIL3 is required for this function. What this implies is that every sub-system in the safety chain must perform to the SIL3 criteria and that the overall safety chain itself must have a net $PFH_D$ in the SIL3 range of $\geq 10^{-8}$ to $<10^{-7}$. The net $PFH_D$ of the safety chain is the sum of the $PFH_D$ for each sub-system in the safety chain. For example, if the light curtain, safety PLC and all six drives each have a $PFH_D$ of $1.25 \times 10^{-8}$ then the net $PFH_D$ of the safety chain is $8 \times 1.25 \times 10^{-8} = 10^{-7}$ which is just at the edge of the $PFH_D$ range for SIL3. From this illustration, it can be seen that there is significant benefit to the user in buying safety-related sub-systems that offer $PFH_D$ values that are much smaller than the upper limit mandated by the SIL.

When the coil of an electromechanical brake is energized, that is to say when the brake is released and the motor is permitted move freely, there is power dissipation in the coil arising from power loss. For example, if the brake coil is driven from 24V DC and the coil current is 2 A, it follows that there is a power loss of 48 W. Recent improvements in the construction of servo motors have allowed the mechanical dimensions to be reduced for a given power rating and this has the side-effect that losses from the brake reduce the motor force rating proportionately more than before. There is also, in general, a desire to be energy efficient and save power where possible. Therefore, there is now a requirement to provide a Safe Brake Control circuit that is also power-saving.

The prior art of brake control will be briefly reviewed. A prior art control circuit (100) for a brake is shown in FIG. 1. Generally, the brake includes an electro-mechanical assembly fitted to the motor, the mechanical construction of which is not illustrated herein. Generally, the brake includes a shoe held against a braking surface by a spring and an electric solenoid that pushes back against the spring and thus releases the brake. A brake coil (101) is a part of the brake. A switch (102) and a diode (103) are included in drive electronics. Two wires connect the brake coil (101) to the drive. In operation, the brake coil (101) is energized through switch (102) which is connected to voltage supply (104), in this case a supply of +24V DC. The switch (102) can be a normally open contact pair in a relay or alternatively a high-side semiconductor switch may be used. The diode (103) may be referred to as a "free-wheeling diode" and is provided in order to protect the switch (102) against excessive voltages when the switch (102) is opened. Under this condition, the current freewheels as indicated by the arrow. The prior art control circuit (100) of FIG. 1 can form part of a safe brake control, provided that additional measures are taken. For example, the switch (102) must be of a particularly reliable construction and a means must be provided to monitor that the contact has been opened. If these measures are in place, then Safe Brake Control meeting SIL2 criteria set forth in IEC62061 can be achieved. Note that in these figures, the brake is shown as being energized from 24V because this is the standard control voltage used in industrial control systems but other control voltages may be used.

The inductance of the brake coil (101), which is the wound portion of the electric solenoid of the brake, may be several millihenries, and therefore the time taken for the current to decay when circulating through diode (103) may be hundreds of milliseconds, thereby delaying the application of the brake. This delay may reduce the effectiveness of the brake in fulfilling a safety function. Attempts to reduce this delay have been made with other prior art designs.

Another prior art control circuit (100) designed for reducing this delay is illustrated in FIG. 2. The application of the brake in the circuit of FIG. 2 is faster than that of FIG. 1 because when switch (102) opens the current free-wheels as shown through diode (103) and Zener diode (201) which is used to absorb a portion of the energy stored as current in the inductance of the brake coil (101), thereby causing the current in the brake (101) to decay faster.

If the highest safety level of SIL3 according to IEC62061 is required, then the brake control must work despite a single a fault being present. The typical prior art solution achieves this by use of two switches connected in series. An example of prior art control circuit (100) designed in this manner for SIL3 performance is depicted in FIG. 3. Even if switch (102) fails closed the safety-related control sub-system in the drive will also open switch (301) and thereby apply the brake. Similarly if switch (301) fails closed then switch (102) can still be opened and thus apply the brake. This embodiment of prior art control circuit (100) also offers protection from the wire of the positive pole (106) of the brake coil (101) being shorted to +24V or the wire to the negative pole (107) of the brake coil (101) being shorted to ground.

Achieving SIL3 will also require the safety sub-system to detect and report faults, for example by monitoring the voltage at each end of the brake coil (101) and comparing this voltage against the expected value when operating switches (102) and (301). In the terminology of functional safety, this is known as having "diagnostic coverage." It is feasible to add diagnostic coverage to the circuit of FIG. 3 by, for example. monitoring the voltage across each switch (102) and (301) or by monitoring the voltages at each end of the brake coil (101).

One drawback with the prior art control circuit (100) of FIG. 3 is that energy is returned to the 24V rail when the brake coil is de-energized. The removal of energy from the brake coil (101) will be rapid but other apparatus connected to 24V may malfunction when the 24V supply rail is driven higher during de-energization. In particular, some 24V power supplies feature an over-voltage crowbar which can be triggered during such an event thereby inadvertently shutting down the control system. Therefore, prior art control circuit (100) of FIG. 3 is not generally suitable for industrial control systems.

A further inadequacy in the prior art designs is that of the lack of brake coil power saving. A brake coil rated for 24V DC operation will release the brake and allow motion if the applied voltage is 24V within some margin stated by the manufacturer, such as ±10%. The minimum voltage to release the brake is commonly referred to as the "pick" voltage. However, having first been released, the brake can be held in that state by applying a lower voltage to the brake coil (101) (referred to as the "hold-off voltage"), for example 17V. Since power loss in the brake coil (101) is proportional to the square of the applied voltage, then the reduction in power loss compared with using the 24V is $1-(17/24)^2 \approx 50\%$.

One technique for achieving this power saving is with an embodiment of a prior art control circuit (100) such as that of FIG. 4. In order to open the brake, switch (401) initially connects switch (102) to 24V (104). After a delay, on the order of seconds, switch (401) changes over to the pole connected to the 17V rail (402). Note that in the embodiment of FIG. 4, the prior art control circuit (100) retains Zener diode (201) (as used in the embodiment of FIG. 2). Therefore, this embodiment also features rapid demagnetization of the brake coil (101). 17V is a conservative estimate for the hold-off voltage that will work with almost any brake. If a better hold-off voltage for the particular brake is known, then further savings can be made by using that hold-off voltage. In some embodiments, this may be as low as 12V. Generally, it is desirable to make the voltage used in the power saving state be adjustable.

As yet another technique, rather than switching between two voltages as shown in FIG. 4, an alternative means for reducing the voltage applied to the brake in the hold-off phase would be to pulse-width modulate switch (102) in FIG. 1 or switch (102) and/or switch (301) in FIG. 3. Specifically, if switch (102) in FIG. 1 were pulse-width modulated with a duty cycle of 70% then an average of 17V would appear across the brake coil (101). However, direct pulse-width modulation (PWM) of the voltage across the brake coil (101) has two serious disadvantages. The first disadvantage is the difficulty and expense of suppressing the consequent switching noise to the level required by regulations on electromagnetic compatibility (EMC). A second disadvantage is that PWM cannot practically be applied to switch (102) in the fast demagnetization circuit of FIG. 2 because of the substantial steady-state losses that would arise in Zener diode (201).

A further requirement or complication to consider is that a drive that includes Safe Brake Control must have two input ports for applying the brake. The process sub-system portion of the drive must be able to apply the brake in order to hold the shaft of the motor stationary when the servo amplifier is not holding the shaft by closed loop control and additionally the safety sub-system must be able to apply the brake whenever an unsafe condition has been detected—over-riding the process system when necessary. The requirement for two control ports has not been considered in FIGS. 1-4.

As one can surmise, an ideal brake control circuit must perform to a number of criteria. The ideal brake control circuit must provide an input port through which the process system in the drive can release the brake using 24V. The circuit must subsequently hold the brake off with an adjustable hold-off voltage, and be capable of applying the brake rapidly by demagnetizing the brake coil quickly. The ideal brake control circuit must also provide at least one further control port through which the safety sub-system in the drive can independently apply the brake, over-riding the process sub-system if necessary and be able to detect faults in the safety-related parts of the brake control circuit. Further, there is also the ever present need to accomplish these goals at the minimum cost and using the minimum board area.

SUMMARY OF THE INVENTION

In one embodiment, a control circuit configured to control an electromechanical brake is provided. The control circuit includes: a switching regulator configured to control a magnitude of voltage applied to a brake coil of the electromechanical brake; wherein said switching regulator includes at least one semiconductor switch, one diode, one capacitor and one inductor; the control circuit is configured such that, in operation, at least one signal from a process sub-system specifies the magnitude of the voltage for the brake coil; and at least one brake applying control signal from a safety sub-system can cause the brake coil voltage to be reduced to a level low enough to apply the brake by opening a switch and each brake applying control signal from the safety sub-system has a corresponding diagnostic feedback signal to the safety sub-system that indicates the state of the corresponding switch.

The switching regulator may be an un-isolating buck regulator. A topology of the switching regulator may include a capacitor that is used to transfer power from an input to an output thereof. A topology of the switching regulator may include a transformer that is used to transfer power from an input to an output thereof. A duty cycle of a switch in the switching regulator may be controlled in an open-loop manner by a pulse width modulated (PWM) control signal from a process sub-system. The switching regulator may be coupled to a switching regulator IC that performs closed loop control of the voltage applied to the brake coil. The switching regulator may be coupled to a time-weighted feedback network whereby voltage applied to the brake coil can be varied by a control signal from a process system that specifies the time weighting of the time-weighted feedback network. A switch in the switching regulator may be configured to be opened by an over-riding first brake applying control signal from the safety sub-system. A switch in the switching regulator may be configured to be set to an open state by a first brake applying control signal from the safety sub-system that by-passes the switching regulator and acts on said switch directly. The brake coil may be controllable by a second, series connected, switch that is operable by a second control signal from the safety sub-system. The brake coil may be coupled to a freewheeling diode and a Zener diode arranged so that current in the brake coil will decay when the second switch is opened.

In another embodiment, a method for controlling an electric motor is provided. The method includes selecting an electric motor configured for control by a control circuit configured to control an electromechanical brake, the control circuit including: a switching regulator configured to control a magnitude of voltage applied to a brake coil of the electromechanical brake; wherein said switching regulator includes at least one semiconductor switch, one diode, one capacitor and one inductor; the control circuit is configured such that, in operation, at least one signal from a process sub-system specifies the magnitude of the voltage for the brake coil; and at least one brake applying control signal from a safety sub-system can cause the brake coil voltage to be reduced to a level low enough to apply the brake by opening a switch and each brake applying control signal from the safety sub-system has a corresponding diagnostic feedback signal to the safety sub-system that indicates the state of the corresponding switch; and, applying at least one control signal to cause the electromechanical brake to brake the electric motor.

In yet another embodiment, a system including an electric motor configured for control by a control circuit is provided. The system includes: an electric motor configured with an electromechanical brake, the electromechanical brake in communication with the control circuit, the control circuit including a switching regulator configured to control a magnitude of voltage applied to a brake coil of the electromechanical brake; wherein said switching regulator includes at least one semiconductor switch, one diode, one capacitor and one inductor; the control circuit is configured such that, in operation, at least one signal from a process sub-system specifies the magnitude of the voltage for the brake coil; and at least one brake applying control signal from a safety sub-system can cause the brake coil voltage to be reduced to a level low enough to apply the brake by opening a switch and each brake applying control signal from the safety sub-system has a corresponding diagnostic feedback signal to the safety sub-system that indicates the state of the corresponding switch; and apparatus configured to provide input to the safety sub-system and cause generation of the at least one brake applying signal.

The brake coil may be controllable by a second, series connected, switch that is operable by a second control signal from the safety sub-system. The electric motor may include one of an induction motor; a synchronous motor; a shunt motor; a separately excited motor; a series motor; a permanent magnet motor; a compounded motor; a stepper motor; a brushless DC motor; a hysteresis motor; a reluctance motor; and a universal motor. The system may be configured for implementation in at least one of food and beverage; packaging and converting; pharmaceutical; material forming; medical laboratory and automation; robotics; printing; labeling; aerospace; tire and rubber; postal sorting; automated vehicles; oil and gas processing; cranes, hoist and elevators.

BRIEF DESCRIPTION OF THE DRAWINGS

The features and advantages of the invention are apparent from the following description taken in conjunction with the accompanying drawings in which.

DETAILED DESCRIPTION OF THE INVENTION

Disclosed herein are methods and apparatus for providing electromechanical brake control for motorized equipment. The technology disclosed herein assures safe operation and power savings sought by associated standards for performance, such as IEC 62061, ISO 13849-1 and ISO 13849-2.

Figure 5:
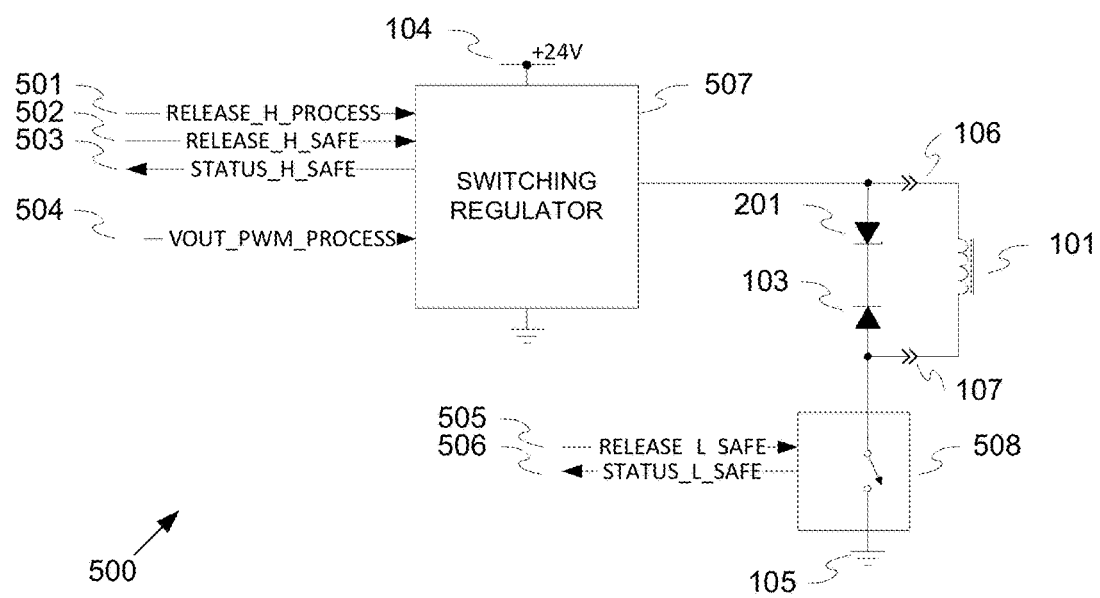
FIG. 5 is a schematic diagram depicting aspects of a power-saving, safe, brake control circuit using a switching regulator.

FIGS. 5-13 depict embodiments of control circuits implementing designs that achieve the intended performance. The central elements of a first embodiment are shown in FIG. 5.

In the embodiment of a control circuit (500) depicted in FIG. 5, a switching regulator (507) is supplied 24V from voltage supply (104). The switching regulator (507) generates an output voltage at the positive pole (106) of the brake coil (101) that can be varied from a reduced voltage (for example, 12V), up to nearly 24V.

In operation, signal RELEASE_H_PROCESS (501) is controlled by the process sub-system. Signal RELEASE_H_SAFE (502) is controlled by the safety sub-system. Release high process signal (501) and release high safe signal (502) must be true for the switching regulator (507) to operate, as otherwise the output voltage at the positive pole (106) will be zero. Signal STATUS_H_SAFE (503) informs the safety sub-system whether the switch in the regulator (507) has opened.

Figure 1:
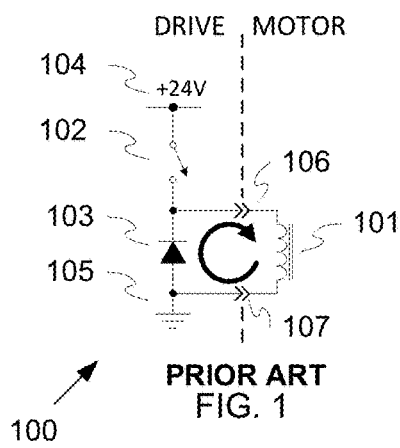
FIG. 1 is a schematic diagram depicting aspects of a prior art brake control circuit using one high-side switch.
Figure 2:
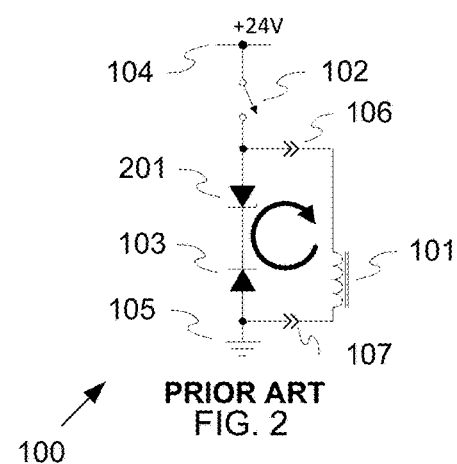
FIG. 2 is a schematic diagram depicting aspects of a prior art brake control circuit with fast decay of current.
Figure 3:
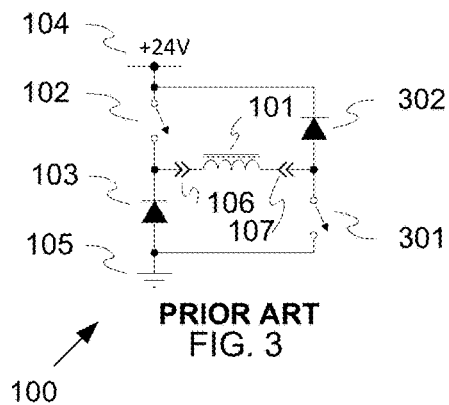
FIG. 3 is a schematic diagram depicting aspects of a prior art brake control circuit using two switches.
Figure 4:
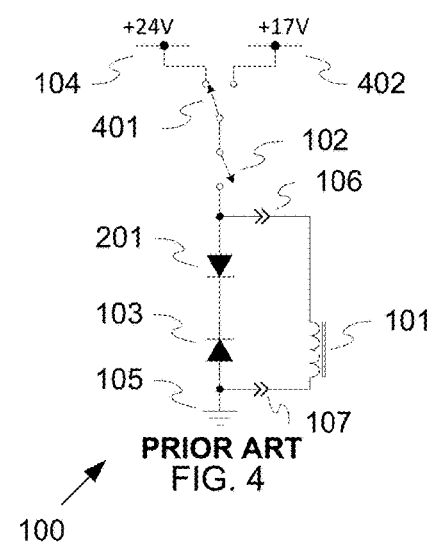
FIG. 4 is a schematic diagram depicting aspects of a prior art brake control circuit using switchable supply rails.

The brake coil (101), freewheeling diode (103) and Zener diode (201) are as described with reference to FIG. 2. A low-side switch (508) can be turned on by the safety sub-system using signal RELEASE_L_SAFE (505) and the status of the switch, namely whether the switch has opened, is indicated via signal STATUS_L_SAFE (506).

Signal VOUT_PWM_PROCESS (504) controls the magnitude of the output of the buck regulator (507) at the positive pole (106). Signal VOUT_PWM_PROCESS (504) is a pulse-width modulated signal and higher duty cycles cause the output voltage at the positive pole (106) to be larger.

Figure 6:
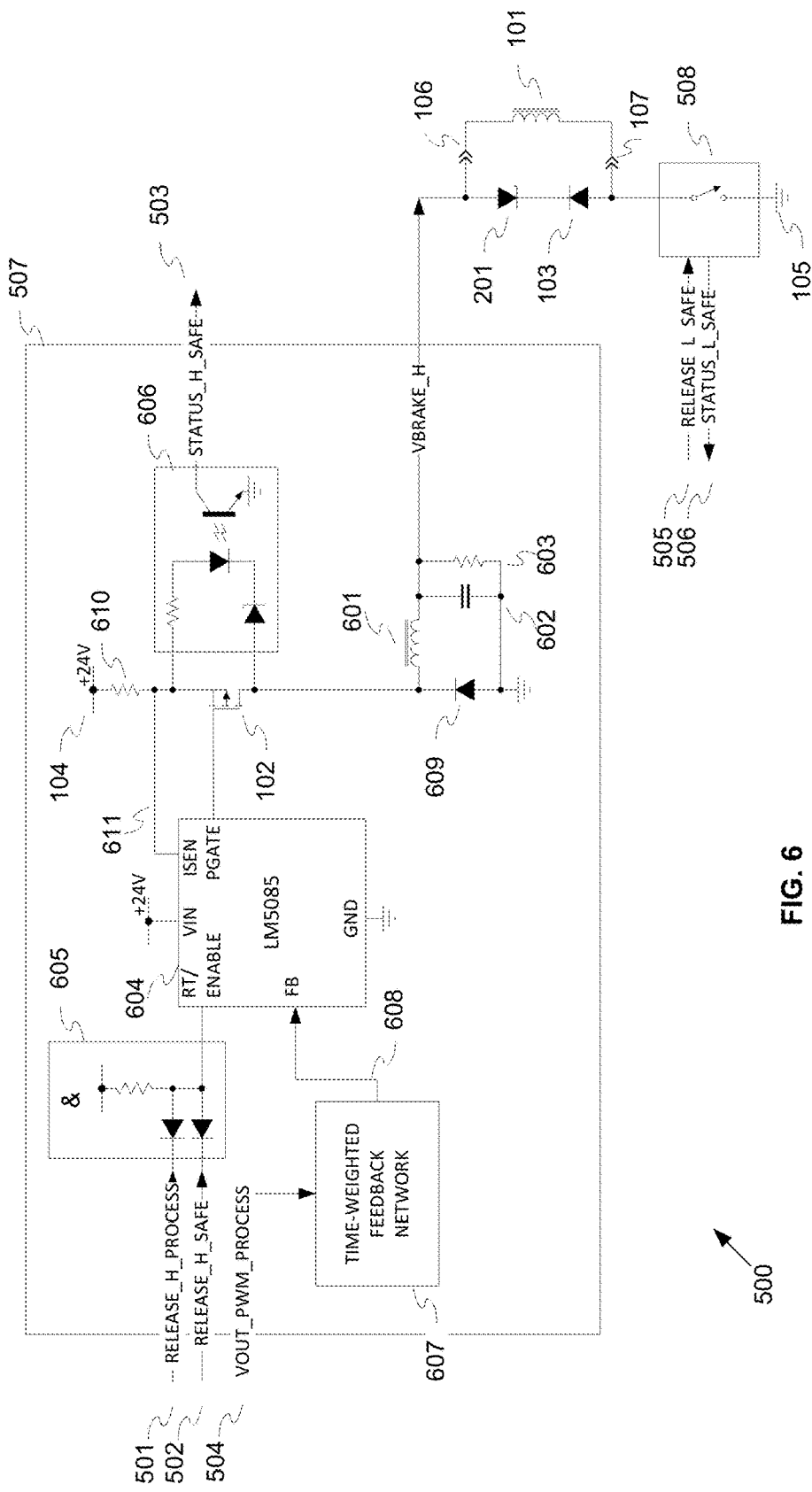
FIG. 6 is a schematic diagram depicting aspects of the power-saving, safe, brake control circuit of FIG. 5, with the switching regulator in greater detail.

The embodiment of the control circuit (500) depicted in FIG. 6 is the same as FIG. 5 but shows the switching regulator (507) in more detail. In this illustration, the high-side switch (102) is a MOSFET which, in combination with a free-wheeling diode (609) and a filter comprising inductor (601) and capacitor (602), forms a buck regulator (which may also be referred to as a "step-down regulator"). This type of switching regulator (507) is well-known and the operating principle will not be described further. In this embodiment, the buck regulator is controlled by a switching regulator control IC (604) such as type LM5085 from Texas Instruments. The switching regulator control IC (604) implements an inner current control loop and also over-current protection in conjunction with a resistor (610) to sense the current and a related signal (611) that is proportional to current but which is referred to +24V the voltage supply (104). Switching regulator control IC (604) is enabled when both signal RELEASE_H_PROCESS (501) and signal RELEASE_H_SAFE (502) are true by controlling the enable input of the switching regulator (604) using a wired-AND circuit (605). Block (606) sets signal STATUS_H_SAFE (503) when switch (102) is off; operation of this circuit is similar to block (508) which will be described with reference to FIG. 8. Signals STATUS_H_SAFE (503) and STATUS_L_SAFE (506) are monitored by the safety control sub-system in the drive (not illustrated), which inserts short test pulses, or rather test notches, into signals RELEASE_H_SAFE (502) and RELEASE_L_SAFE (506) to verify the opening of the respective switches. The test pulses disconnect the brake coil (101) too briefly to have any significant mechanical effect on the brake. Setting signal RELEASE_H_SAFE (502) to false turns off the switching regulator and in order for the output to go zero, output capacitor (602) is loaded by resistor (603). Zener diode (201) will conduct during each test pulse but note however that the test pulses are infrequent and there is no significant resultant power loss.

Figure 7:
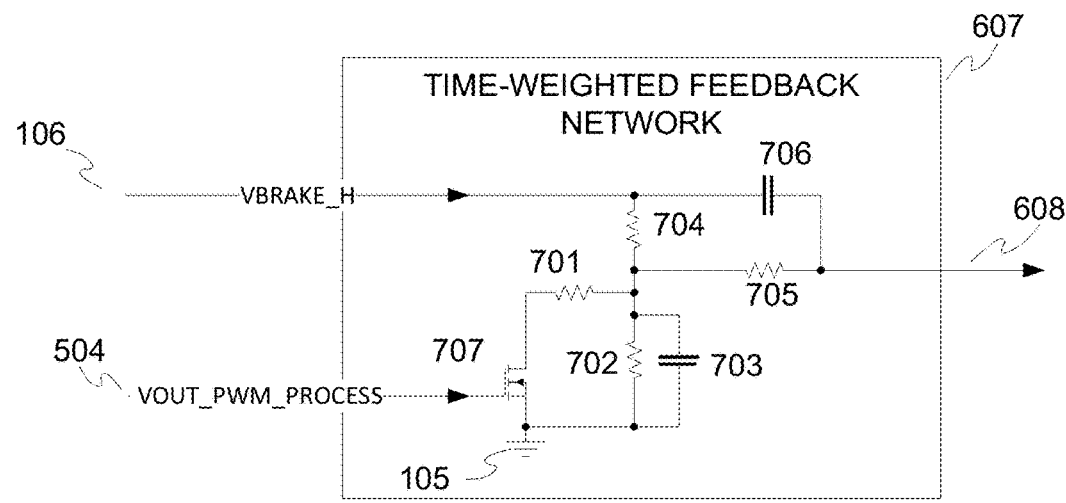
FIG. 7 is a schematic diagram depicting additional detail for a time-weighted feedback network as depicted in FIG. 6.

In the control circuit (500), a capability to vary the output voltage supplied to the positive pole (106) of the brake coil (101) is included. Unfortunately almost all, off-the-shelf switching regulator control ICs (such as the LM5085) are intended to control a fixed output voltage and have no built-in capabilities for allowing the output voltage to be changed by varying the reference voltage. An alternative technique is to supply the feedback input (608) of the switching regulator IC (604) with a variable fraction of the output voltage. In this example, this is cost-effectively implemented using a time-weighted feedback network (607) as illustrated in FIG. 7. In FIG. 7, let R(701) denote resistor (701) and similarly let C(703) denote capacitor (703). When signal VOUT_PWM_PROCESS (504) is false, then gain switch (707) is OFF and R(701) is disconnected. In this example, gain switch (707) is a MOSFET. The resultant feedback fraction is denoted as $FR_{off}$. When signal VOUT_PWM_PROCESS (504) is true, then gain switch (707) is ON and R(701) is connected. The resultant feedback fraction is denoted as $FR_{on}$. Letting delta($\delta$) signify the proportion of time for which VOUT_PWM_PROCESS (504) is true, then the average feedback fraction is FF=delta($\delta$)×$FF_{on}$+(1−delta($\delta$))×$FF_{off}$.

As a simple example, if resistors R(701), R(702) and R(704) are of equal value then the average feedback fraction FF=delta(δ)×FF$_{on}$+(1−delta(δ))×FF$_{off}$=delta(δ)/3+(1−delta (δ))/2=(3−delta(δ))/6. This set of resistors allows the feedback fraction of signal (608) to be continuously varied between 0.5 and 0.33 by varying delta(δ).

In this embodiment, R(705) in combination with C(706) are included to permit high-frequency feedback. C(703) filters the feedback fraction to prevent steps from appearing in the output voltage (106) when gain switch (707) is switched. By this technique, signal VOUT_PWM_PROCESS (504) controls the output voltage at the positive pole (106) of the brake (101).

Figure 8:
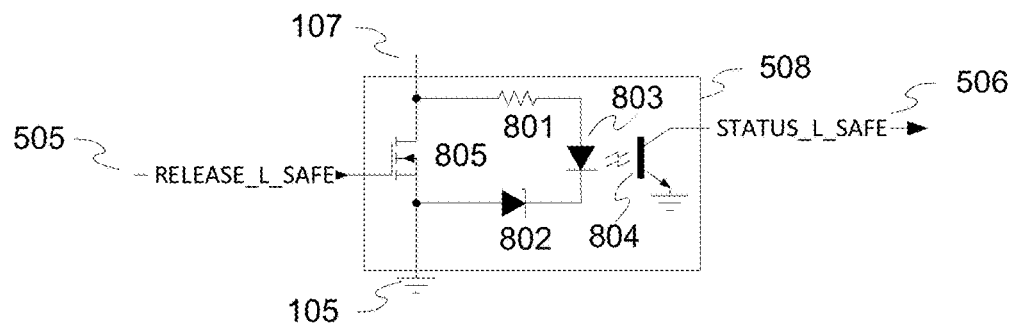
FIG. 8 is a schematic diagram depicting additional detail for a low-side switch circuit as depicted in FIG. 6 showing feedback of status.
Figure 9:
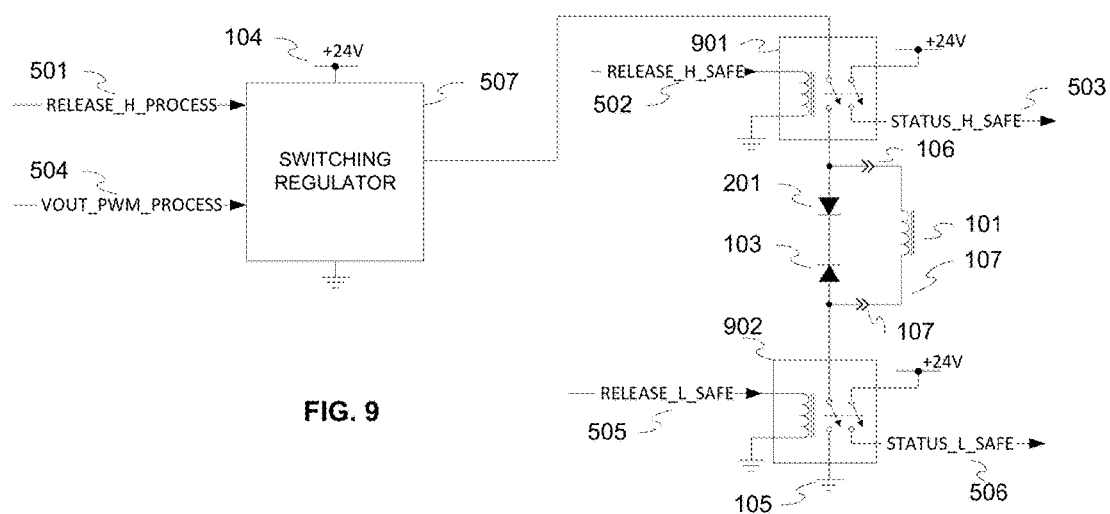
FIG. 9 is a schematic diagram depicting aspects of a power-saving, safe, brake control circuit using switching regulator and relays.

In FIG. 8, the low side switch circuit (508) is depicted as a MOSFET (805) and in a practical implementation a self-protecting MOSFET is likely to be used. When MOSFET (805) turns off, there is a voltage across it and current flows through R(801), the diode portion of opto-isolator (804) and backwards through Zener diode (802). Thus the opto-isolator (804) sends a pulse to the safety control system, not shown, when the MOSFET (805) turns off and by this means diagnostic coverage may be achieved.

In summary therefore, the embodiment depicted in FIG. 5 (and the associated FIGS. 6-8) achieves power saving control of the brake with a variable voltage using a switching regulator controlled by just one PWM signal (504) and secondly achieves two-channel safe brake control and power saving brake control using only two power switches whereby one of the switches also acts as the switch in the switching regulator.

In a variation on the embodiment, the drive need not contain a safety control sub-system but does allow safe brake control to be achieved in conjunction with an external safety control device such as a safety PLC. Thus in the second preferred embodiment the switching regulator (507) is retained but now the low side switch circuit (508) is replaced by a relay (902) with two normally open contacts. A second similar relay (901) is inserted between the output of the switching regulator (507) and the positive pole (106) of the brake (101). Both signals RELEASE_SAFE_H (502) and RELEASE_SAFE_L (505), which are controlled by an external safety system, are driven for the brake to be released. The state of each relay (901) and (902) is brought out to the external safety system as signals STATUS_H_SAFE (503) and STATUS_L_SAFE (506) so that the operation of the relays can be monitored, i.e. to provide diagnostic coverage. By this technique, it is possible to achieve SIL3 two-channel safe brake control and still enjoy the benefits of power saving in the brake coil. Comparing the second embodiment of FIG. 9 with the first embodiment of FIGS. 5-8 it will be seen that second embodiment requires an additional switching element.

Figure 10:
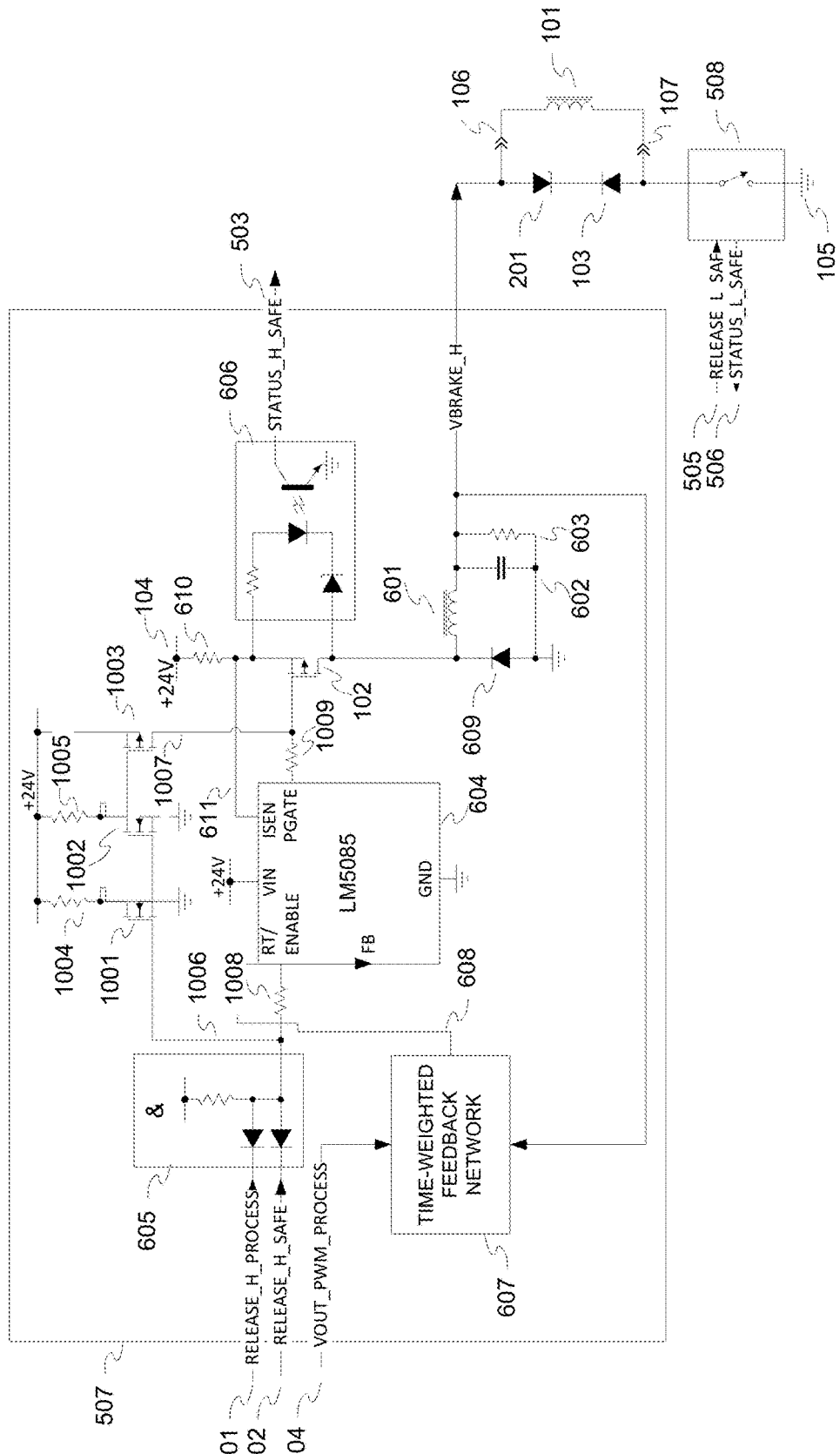
FIG. 10 is a schematic diagram depicting aspects of a direct turn-off of high side switch in switching regulator.
Figure 11:
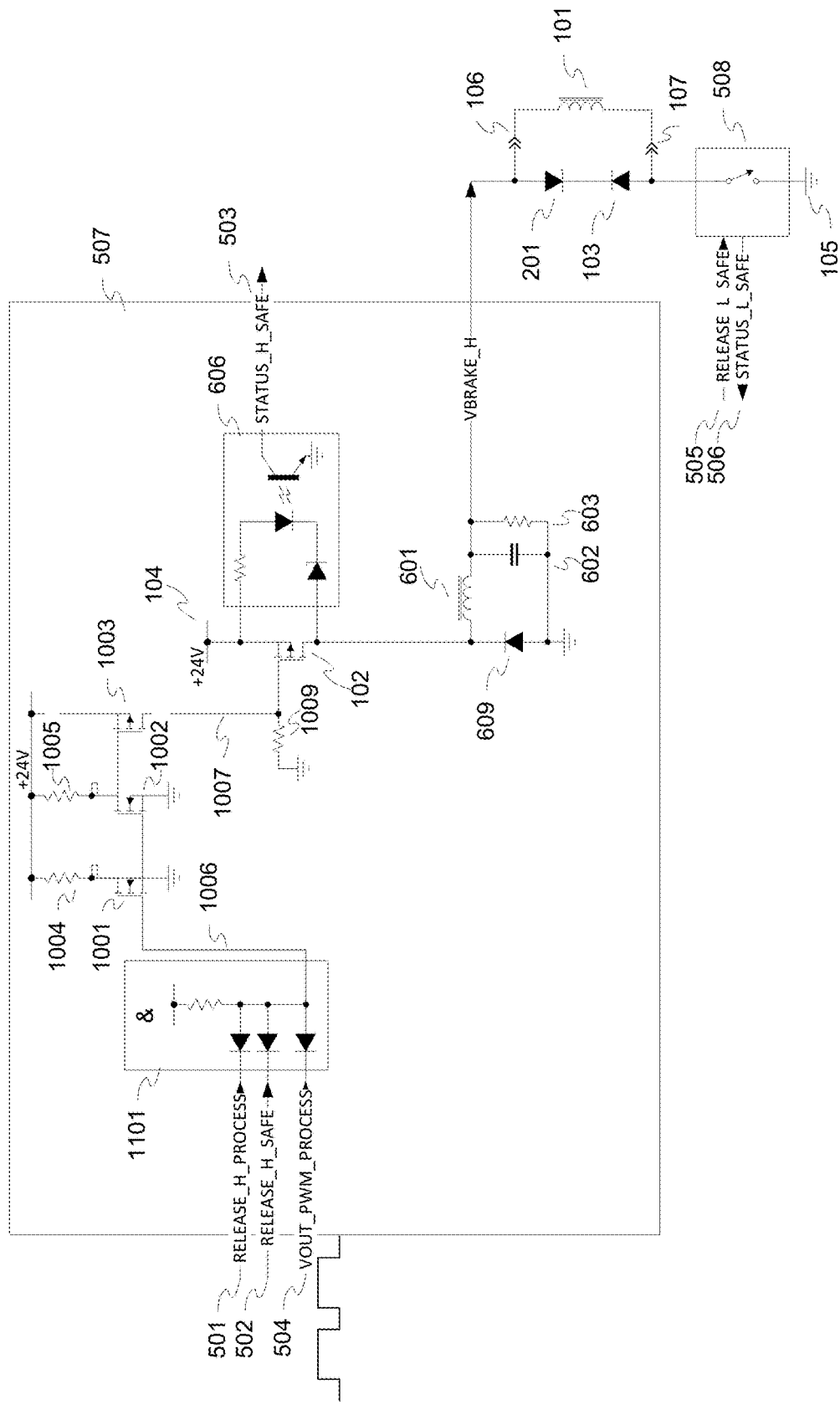
FIG. 11 is a schematic diagram depicting aspects of a power-saving, safe, brake control circuit using switching regulator, with open loop control of brake voltage.

In the domain of functional safety a "simple circuit" uses resistors, capacitors, diodes, transistors and relays but excludes integrated circuits. When certifying products with safety functions, there are well-tried methods for estimating the reliability of simple circuits. On the other hand, it is difficult to obtain detailed reliability data on parts of even moderate complexity such as the switching regulator (604). Thus a third embodiment presented is a variation on the first embodiment. In the third embodiment, in order to increase the predicted reliability of the circuit, the designer may additionally or alternatively arrange for the output of the wired-AND circuit (605) to act more directly on the high-side MOSFET (102), by for example, using a simple circuit to over-ride control of the gate of the high-side MOSFET (102). This is illustrated in FIG. 10 which adds MOSFETS (1001), (1002), (1003) and resistors (1004), (1005), (1008), (1009). When signals (501) and (502) are high then signal (1006) is high and this causes MOSFET (1001) to be ON thereby causing MOSFET (1002) to be OFF, thereby allowing the gate of MOSFET (1003) to be pulled to its source potential via resistor (1005) so that MOSFET (1003) is OFF and consequently switching regulator control IC (604) can control the gate of MOSFET (102). Conversely when either signal (501) or signal (502) is low then signal (1006) is low and this causes MOSFET (1001) to be OFF thereby causing MOSFET (1002) to be ON, thereby pulling the gate of MOSFET (1003) negative with respect to its source potential via resistor (1005) so that MOSFET (1003) is ON and consequently switching regulator control IC (604) cannot control the gate of MOSFET (102) which is held in the OFF state. The output signal (1006) of the wired AND gate (605) is shown as being additionally connected to RT/ENABLE input of the switching regulator control IC (604) thereby activating the slow-start of IC (604) when signals (501) and (502) are high, this is desirable but not essential and therefore resistor (1008) could be omitted.

There are many advantages to using a closed-loop voltage regulator (507) as depicted in FIG. 6 and FIG. 10. The closed loop action ensures that the hold-off value of the brake voltage at the positive pole (106) does not depend on how much current is drawn by the brake nor does it depend on the actual value of the 24V control supply and therefore this scheme is preferred in products that are sold on the general market. If, however, the current drawn by the brake and the value of control supply are known, fixed, values then it is possible to dispense with closed-loop regulation as shown in the fourth preferred embodiment of FIG. 11. Comparing FIG. 11 with the first embodiment of FIG. 6, it will be seen that the signal VOUT_PWM_PROCESS (504) is presented to a three-input wired AND gate (605) which controls the main high-side switch (102) directly using a level-translating network (1001), (1102), (1003), (1004), (1005) of FIG. 10. The embodiment of FIG. 11 has no PWM regulator IC (604) nor does it have a time-weighted feedback network (607). In a buck regulator like that found in FIG. 11, the ratio of {ON time of high-side switch (102)}/{ON time of main switch (102)+OFF time of main switch (102)} is called the duty cycle. Assuming the output current is continuous, then the output voltage at the positive pole (106) is approximately equal to the input voltage (104) multiplied by the duty cycle. The duty cycle of the high-side switch (102) is in turn controlled by and is essentially the same as the duty of the signal VOUT_PWM_PROCESS (504). For example if the duty cycle of signal VOUT_PWM_PROCESS (504) is 71% as sketched by signal (504) in FIG. 11 then the voltage at the positive pole (106) is equal to the 24V supply (104) multiplied by 0.71 which equals 17V. In practice the voltage at the positive pole (106) will be less that 17V owing losses in the diode (609), high-side switch (102) and inductor (601) but for a known load these losses are almost constant and the duty cycle of signal VOUT_PWM_PROCESS (504) can be adjusted to obtain the desired voltage at the positive pole (106).

It is highly desirable for a safety sub-system to offer low net PFH$_D$ values for a safety control function such as safe brake control. The first, second, third and fourth embodiments all apply the brake using switches of moderate intrinsic reliability but achieve low PFH$_D$ values for the safe brake control function by having two such switches in series with the brake combined with detection signals (503) and (506) of the failure of each switch (102) and (805). If the intrinsic reliability of either switch or of both switches could be increased then an even higher overall $PFH_D$ values could be obtained (see equation D.1 in IEC 62061 Edition 1.1 2012 November). The failure rates of capacitors are far lower than of semiconductor switches (102), (805) or relays (901), (902). The failure rates for transformers are even lower than for capacitors and are so low that Table D.12 of ISO 13849-2:2012(E) allows inter-winding insulation failure to be disregarded or "excluded" to use the terminology of functional safety. Therefore, if the voltage switched by the high-side switch (102) of the switching regulator (507) could be transferred to the load via a capacitor or via a transformer or via a series combination of a capacitor and a transformer then it would be possible to achieve fail-safe operation of the high-side switch (102) because a failure of the switch (102) to always ON or always OFF would transfer no power.

The reference "Designing DC/DC converters based on Zeta topology" from the Texas Instruments Analog Journal Q2 2010 (which is incorporated herein by reference in its entirety), describes the Zeta switching regulator which transfers power to the output via capacitor, which may be used in a fifth embodiment.

Figure 12:
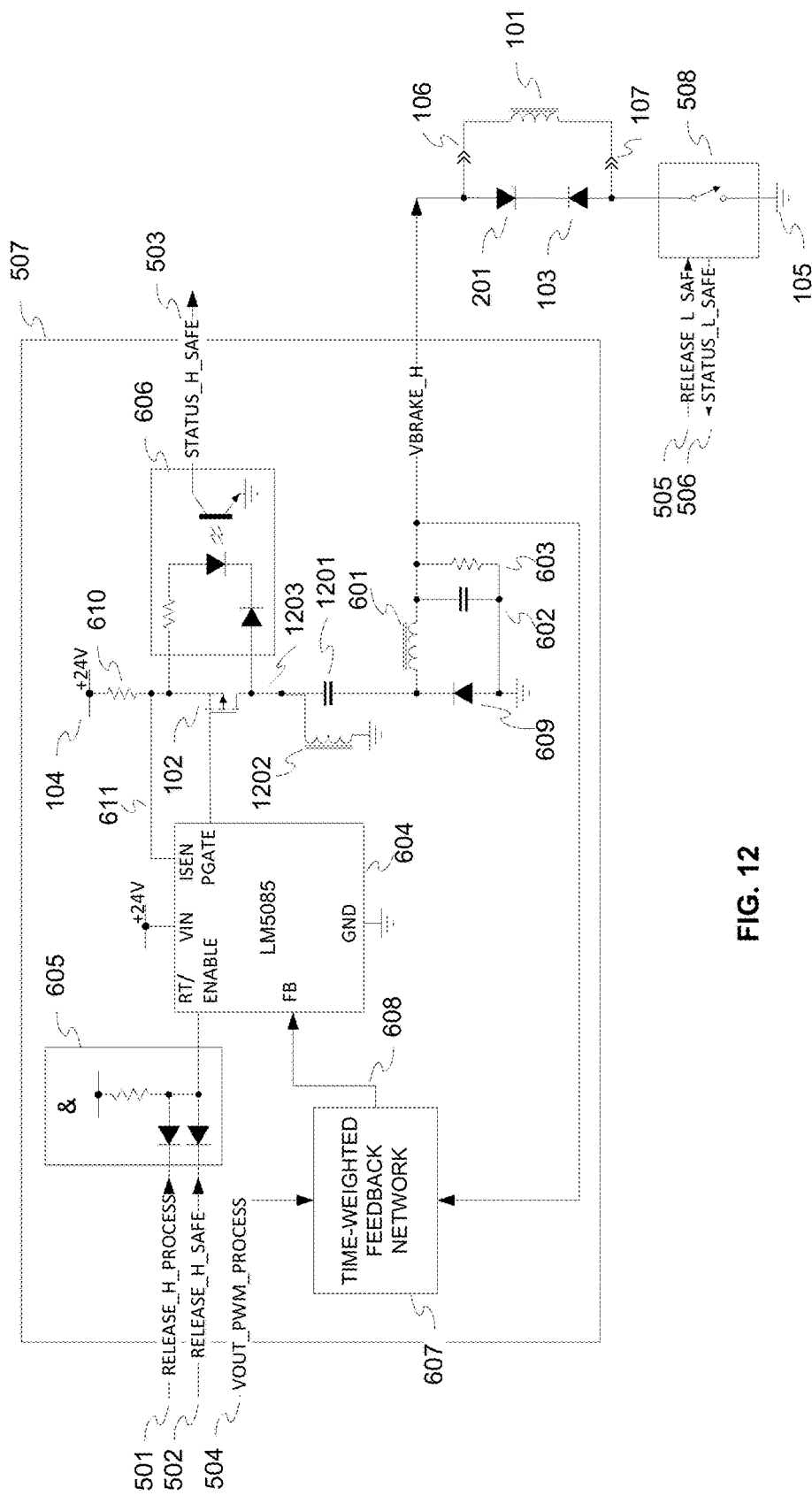
FIG. 12 is a schematic diagram depicting aspects of a power-saving, safe, brake control circuit using a capacitor-coupled switching regulator implementing a Zeta topology.

In the fifth embodiment, the regulator (507) is modified from the buck topology of FIG. 6 to the Zeta topology shown in FIG. 12 and also differs from FIG. 6 by the addition of capacitor (1201) and inductor (1202). The Zeta converter topology is formed from elements (102), (601), (602), (603), (1201) and (1202). In the event that a fault causes the high-side switch (102) to be permanently ON, signal (1203) is pulled to 24V and there can be no sustained power transfer through capacitor (1201) and therefore the brake coil (101) will be de-energized thereby applying said brake. By this means of transferring power via capacitor, the fifth embodiment allows the development of power-saving, safe brake control with increased $PFH_D$ by eliminating failure of the high-side switch (102) from $PFH_D$ calculations.

A further advantage of the Zeta circuit in FIG. 12 is that it is possible to supply 24V when releasing the brake even when the supply itself (104) is less than 24V because the gain of the circuit with respect to the duty cycle of switch (102) is delta(δ)/(1−delta(δ)). For example if the nominally 24V (104) supply is actually 20V then by setting delta(δ)= 0.55, the gain is 0.55/(1−0.55)=1.22 and the regulator output will be 24.4V.

Figure 13:
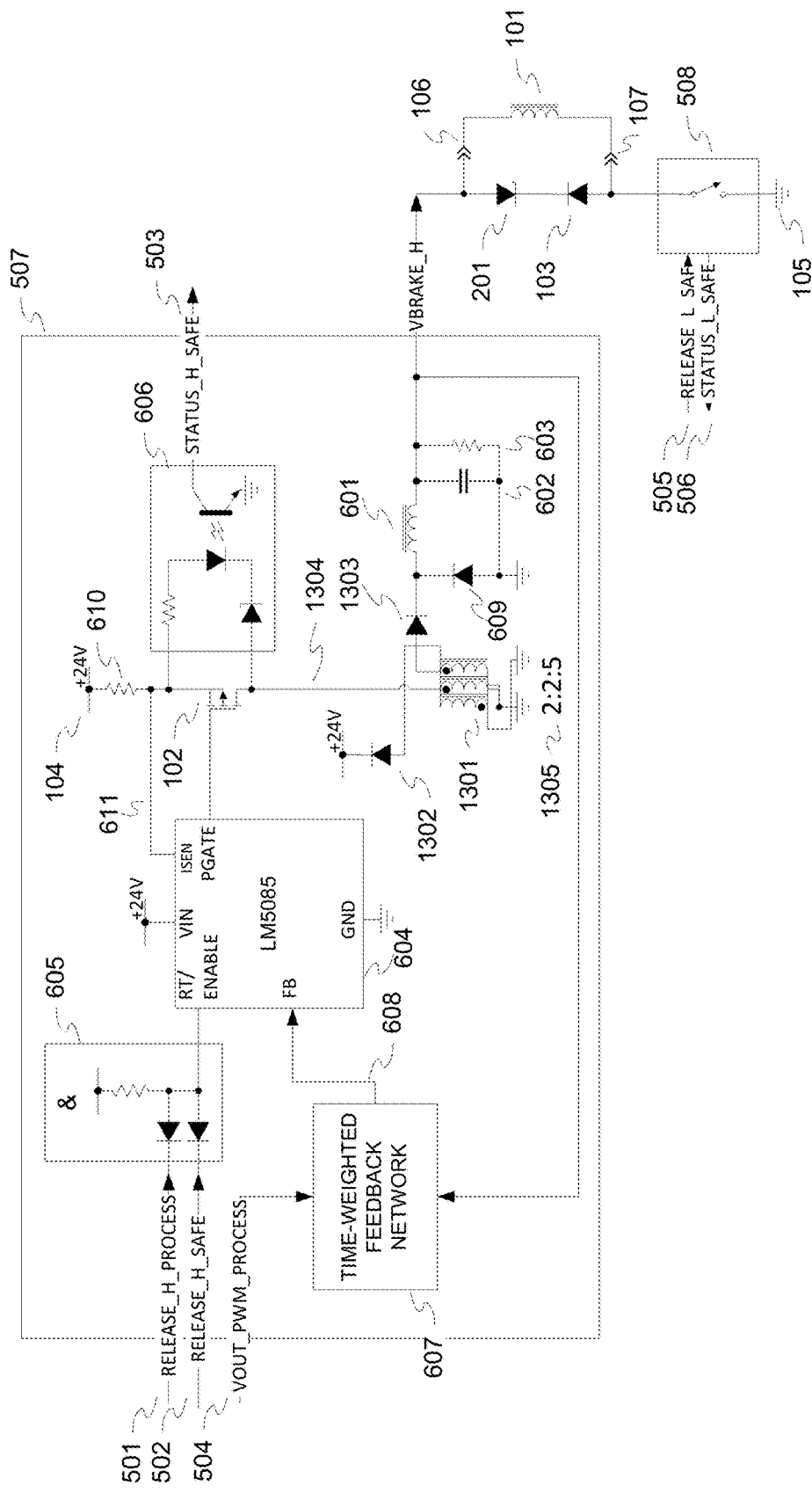
FIG. 13 is a schematic diagram depicting aspects of a power-saving, safe, brake control circuit using a transformer-coupled switching regulator.

In the sixth embodiment of FIG. 13 the regulator (507) is modified to be transformer isolated. FIG. 13 is derived from FIG. 6 by adding transformer (1301) and diodes (1302) and (1303). The essential elements of the single transistor forward converter are the high-side switch (102), transformer (1301), diodes (609), (1301), (1302), inductor (601) and capacitor (602). Forward converters are well-known circuits whose normal operation will not be described further. In the event that a fault causes the high-side switch (102) to be permanently ON, signal (1304) is pulled to 24V and there can be no sustained power transfer through transformer (1301) and therefore the brake coil (101) will be de-energized thereby applying said brake. The duty cycle of high-side switch (102) must be limited to 50% to allow the flux in transformer (1301) to be reset via diode (1302) at every switching cycle and therefore the turns ratio (1305) must step-up the output so that 24V can be applied to the brake, this also has the further advantage of permitting operation when the supply voltage (104) is less than the 24V nominal value. By this means the sixth embodiment allows the development of power-saving, safe brake control with increased $PFH_D$ by eliminating failure of the high-side switch (102) from $PFH_D$ calculations.

In a variant of the fifth embodiment the two inductors (601) and (1202) of FIG. 12 could be combined into a single coupled inductor in order save cost. Further possible variants of the fifth embodiment could use the same or similar components to implement alternative capacitor-coupled converter circuits such as SEPIC or Cúk both of which are well-known and will not be described further. In variants of the fifth and sixth embodiments a more direct method, such as that shown in FIG. 10, of controlling the high side switch (102) could also be applied to FIG. 12 or FIG. 13. In the sixth embodiment of FIG. 13 the output of the switching regulator (507) is referred to ground, a variant would be to disconnect the output winding of transformer (1301) so that the brake coil (101) is driven by a fully isolated source, this would be advantageous because accidental grounding of either side of the brake coil would have no effect on the safe control of the brake. The open loop control of the fourth preferred embodiment shown in FIG. 11 could be applied to fifth embodiment of FIG. 12 or sixth embodiment of FIG. 13. The sixth embodiment of FIG. 13 uses a transformer isolated version of the buck topology but alternative topologies such as the fly-back circuit could be used. In a variant of the fifth embodiment of FIG. 12 it would be possible to add transformer isolation to the capacitor coupled topology by replacing inductor (1202) with a two winding inductor; this principle also applies to SEPIC and Cúk variants.

All of the preferred embodiments regulate the voltage at the positive pole (106) of the brake (101) with respect to ground but the circuits could be re-arranged to regulate the voltage at the negative pole (107) with respect the +24V supply (104) without change to the principles of operation.

As discussed herein, the term "power saving" and other related terms generally refer to reduced power use for the technology disclosed herein when considered in comparison to prior art systems. This is not to imply the technology disclosed herein provides power storage.

Figure 14:
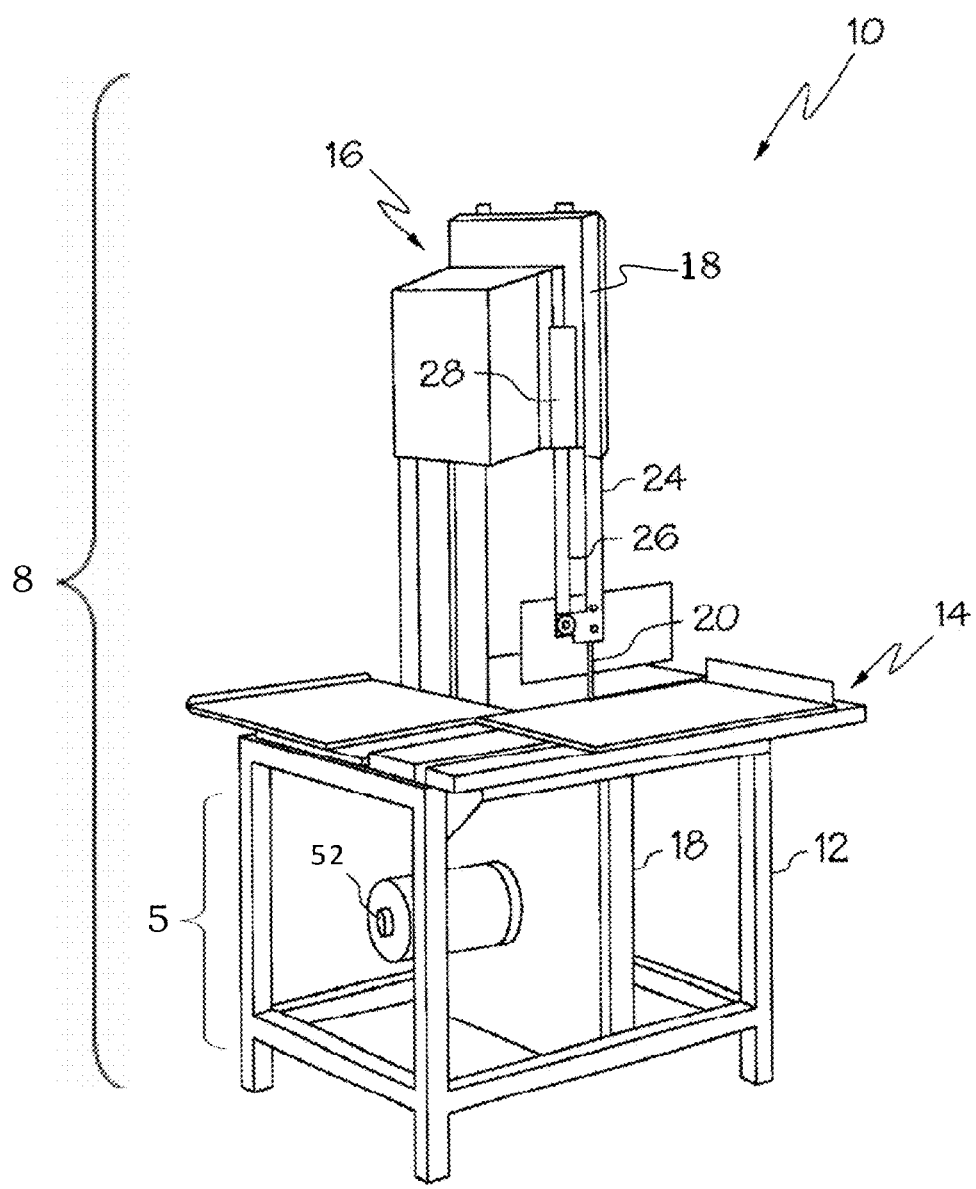
FIG. 14 is an illustration of equipment that makes use of an electric motor drive configured with a power-saving, safe, brake control circuit as disclosed herein.

FIG. 14 is an illustration of a system (5) that includes equipment (8) that makes use of an electric drive motor (52) configured with a power-saving, safe, brake control circuit (500) as disclosed herein. In this example, the equipment (8) is provided as part of a food processing station (10). The food processing station (10) includes band saw (16). Food processing apparatus such as band saw (16) are commonly used for cutting meat products of a variety of sizes. In the exemplary embodiment, band saw (16) includes a frame (12) upon which is mounted a support surface (14) for positioning meat products to be cut. A housing (18) extends above support surface (14) and housing (18) also extends below support surface (14). A band saw blade (20) passes through a plane defined by support surface (14) and extends around wheel members (not shown) located with housing (18) for being drivingly rotated by such wheel members. Drive motor (52) may be connected for rotating a drive wheel in housing (18). A blade guard (24) extends around the cutting edge of blade (20) and downward from housing (18) toward support surface (14). Blade guard (24) is connected to a guide bar (26) which extends upward toward housing (18) and through a guide assembly (28) which is mounted to housing (18). Guide bar (26) may be positioned by sliding within guide assembly (28) such that guide bar (26) can be moved upward or downward through such guide assembly if a sufficient moving force is applied thereto. However, with no moving force applied guide assembly (28) engages guide bar (26) with sufficient force to hold guide bar (26) and blade guard (24) in position. Because blade guard (24) is connected to guide bar (26) for movement therewith, the length of band saw blade (20) which is protected by the blade guard (24) can be varied by varying the position of guide bar (26) relative to guide assembly (28).

Although blade guard (24) extends around the cutting edge of blade (20), operators are at least partially exposed to blade (20) and inherently, there is risk of injury. Accordingly, the system (5) implements control circuit (500) as a controller for controlling drive motor (52). In combination with safety sub-system including sensing equipment (not shown) feedback may be provided to control circuit (500). Accordingly, the system (5) may be configured to detect interference (i.e., a safety hazard) with equipment (8), such as contact of the operator with the blade (20). When contact is sensed by sensing equipment, a signal is sent to the control circuit (500). The control circuit (500) then initiates the safe shutdown of the drive motor (52) in accordance with the teachings disclosed herein.

Although the system (5) is shown as implementing a food processing station (10) including a band saw (16), any type of equipment deemed appropriate may make use of the drive motor (52) configured with the control circuit (500) as disclosed herein. For example, the drive motor may be used in industries or settings involved with food and beverage; packaging and converting; pharmaceutical; material forming; medical laboratory and automation; robotics; printing; labeling; aerospace; tire and rubber; postal sorting; automated vehicles; oil and gas; and any other environment deemed appropriate.

The drive motor may include any type of motor deemed appropriate. For example, the drive motor be driven by alternating current (AC) or direct current (DC). For example, the drive motor may include, without limitation: an induction motor; a synchronous motor; a shunt motor; a separately excited motor; a series motor; a permanent magnet motor; a compounded motor; a stepper motor; a brushless DC motor; a hysteresis motor; a reluctance motor; a universal motor; and any one or more of a variety of other types of motors. The motor may cause rotary motion or linear motion directly or indirectly, such as through mechanical linkages. The drive motor may include any type of material deemed appropriate. For example, stainless steel, steel alloys, cast iron and/or other materials such as polymeric materials may be used.

The teachings herein may be used to supply a kit for retrofit of existing equipment. For example, an existing brake controller may be replaced with a control circuit as described herein. Additional components such as replacement power supplies and other modifications as deemed appropriate may be included.

Where the teachings herein are configured for implementation in a particular industry, this is considered to involve arrangement of the technology with production equipment as may be used within that industry. Very often, this involves specialized equipment designed for particular applications. Examples of industries making use of specialized equipment that may benefit from the teachings herein include, without limitation, at least one of food and beverage; packaging and converting; pharmaceutical; material forming; medical laboratory and automation; robotics; printing; labeling; aerospace; tire and rubber; postal sorting; automated vehicles; oil and gas processing industries; cranes, hoist and elevators.

LIST OF REFERENCE NUMERALS

For convenience of referencing, and not as a definitive nor determinative listing, a general description of each element is provided in association with the reference number used in the drawings to indicate that element. This listing is not provided as an exhaustive description nor as a complete listing. This listing is not intended to have one-to-one or verbatim correlation with the description above, but may further define elements listed. Other elements may be included and other functionality may be imputed to a particular element.

| Ref. no.: | Element |
|---|---|
| (100) | Prior art control circuit |
| (101) | Brake coil |
| (102) | High-side switch |
| (103) | Diode, low-side freewheeling diode |
| (104) | power supply, +24 V control supply voltage rail |
| (105) | Ground and return for +24 V control supply voltage rail |
| (106) | Connection to the positive pole of the brake |
| (107) | Connection to the negative pole of the brake |
| (201) | Zener diode to speed up the current decay time |
| (301) | Low-side switch |
| (302) | High-side freewheeling diode |
| (401) | Switch to select greater or lesser voltage |
| (402) | Lesser supply rail used for power saving |
| (500) | Control circuit |
| (501) | Control signal from the process sub-system to the brake circuit to request that the brake be released using the high-side switch |
| (502) | Control signal from the safety sub-system to the brake circuit to request that the brake be released |
| (503) | Status signal form the brake circuit to the safety sub-system indicating the whether the high-side switch can be opened |
| (504) | Pulse-width modulated control signal from the process sub-system to the brake circuit that causes a lesser voltage to be applied to the brake |
| (505) | Control signal from the safety sub-system to the brake circuit to request that the brake be released using the low-side switch |
| (506) | Status signal from the brake circuit to the safety sub-system indicating the whether the low-side switch can be opened |
| (507) | Switching regulator circuit |
| (508) | Low-side switch circuit |
| (601) | Inductor in the output filter of the switching regulator |
| (602) | Capacitor in the output filter of the switching regulator |
| (603) | Resistor load in the output filter of the switching regulator |
| (604) | Switching regulator controller integrated circuit |
| (605) | Wired-AND gate enabling the switching regulator |
| (606) | Circuit to detect state of high-side switch |
| (607) | Time-weighted feedback network |
| (608) | Output signal from time-weighted feedback network, feedback signal to the switching regulator |
| (609) | Free-wheeling diode in the output filter of the switching regulator |
| (610) | Resistor for high-side current-sensing |
| (611) | Signal proportional to high-side current |
| (701) | Resistor in the time-weighted feedback network |
| (702) | Resistor in the time-weighted feedback network |
| (703) | Capacitor in the time-weighted feedback network |
| (704) | Resistor in the time-weighted feedback network |
| (705) | Resistor in the time-weighted feedback network |
| (706) | Capacitor in the time-weighted feedback network |
| (707) | Gain switch in the time-weighted feedback network |
| (801) | Resistor in the low side switch circuit |
| (802) | Zener diode |
| (804) | Opto-isolator |
| (805) | MOSFET |
| (901) | High-side relay |
| (902) | Low-side relay |
| (1001) | Transistor in circuit that controls the high-side switch directly |
| (1002) | Transistor in circuit that controls the high-side switch directly |
| (1003) | Transistor in circuit that controls the high-side switch directly |
| (1004) | Pull-up resistor in circuit that controls the high-side switch directly |
| (1005) | Pull-up resistor in circuit that controls the high-side switch directly |
| (1006) | Output of wired-AND gate |
| (1007) | Control signal of high-side switch |
| (1008) | Resistor that buffers the enable input of the switching regulator IC |
| (1009) | Resistor that buffers the output signal input of the switching regulator IC |
| (1101) | Three-input wired AND gate |
| (1201) | Coupling capacitor of Zeta regulator |

-continued

| Ref. no.: | Element |
|---|---|
| (1202) | Boost stage inductor of Zeta regulator |
| (1301) | Transformer of forward regulator |
| (1302) | Transformer de-magnetizing diode of forward regulator |
| (1303) | Forward diode of forward regulator |
| (1304) | Signal coupling high-side switch and transformer of forward regulator |
| (1305) | Example turns ratio set for the transformer of the forward regulator |
| (5) | System |
| (8) | Equipment |
| (10) | Food processing station |
| (12) | Frame |
| (14) | Support surface |
| (16) | Band saw |
| (18) | Housing |
| (20) | Drive motor |
| (24) | Blade guard |
| (26) | Guide bar |
| (28) | Guide assembly |
| (52) | Drive motor |

Although certain example methods, apparatus and articles of manufacture and design have been described herein, the scope of coverage of this disclosure is not limited thereto. On the contrary, this disclosure covers methods, apparatus and articles of manufacture and design falling within the scope of the appended claims either literally or under the doctrine of equivalents.

Various other components may be included and called upon for providing for aspects of the teachings herein. For example, additional components, signals, and/or combinations thereof as well as any omissions thereof may be used to provide for added embodiments that are within the scope of the teachings herein.

A variety of modifications of the teachings herein may be realized. For example, it should be recognized that other circuit designs may be realized. Additionally, a variety of applications not presented herein may make use of or benefit from the technology disclosed. Accordingly, the examples provided herein are merely illustrative and are not limiting of the technology.

Generally, modifications may be designed, incorporated or implemented according to the needs of a user, designer, manufacturer or other similarly interested party. The modifications may be intended to meet a particular standard of performance considered important by that party. Therefore, standards of performance or adequacy are to be judged by such a party.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements. As used herein, the term "exemplary" is not intended to imply a superlative example. Rather, "exemplary" refers to an embodiment that is one of many possible embodiments.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A control circuit configured to control an electromechanical brake, the control circuit comprising:
    a switching regulator configured to control a magnitude of voltage applied to a brake coil of the electromechanical brake, wherein said switching regulator comprises at least one semiconductor switch, one diode, one capacitor and one inductor;
    wherein the control circuit is configured such that, in operation, at least one signal from a process sub-system specifies the magnitude of the voltage for the brake coil; and
    at least one brake applying control signal from a safety sub-system that causes the brake coil voltage to be reduced to a level that is effectively zero, thereby applying the brake by opening a switch, wherein each brake applying control signal from the safety sub-system has a corresponding diagnostic feedback signal to the safety sub-system that indicates the state of the corresponding switch;
    wherein the switching regulator is coupled to a time-weighted feedback network whereby voltage applied to the brake coil can be varied by a control signal from a process system that specifies the time weighting of the time-weighted feedback network.

2. The control circuit of claim 1, wherein the switching regulator is an un-isolating buck regulator.

3. The control circuit of claim 1, wherein a topology of the switching regulator comprises a transformer that is used to transfer power from an input to an output thereof.

4. The control circuit of claim 1, wherein a duty cycle of a switch in the switching regulator is controlled in an open-loop manner by a pulse width modulated (PWM) control signal from a process sub-system.

5. The control circuit of claim 1, wherein the switching regulator is coupled to a switching regulator IC that performs closed loop control of the voltage applied to the brake coil.

6. The control circuit of claim 1, wherein a switch in the switching regulator is configured to be opened by an overriding first brake applying control signal from the safety sub-system.

7. The control circuit of claim 1, wherein a switch in the switching regulator is configured to be set to an open state by a first brake applying control signal from the safety sub-system that by-passes the switching regulator and acts on said switch directly.

8. The control circuit of claim 1, wherein the brake coil is controllable by a second, series connected, switch that is operable by a second control signal from the safety sub-system.

9. The control circuit of claim 1, wherein the brake coil is coupled to a freewheeling diode and a Zener diode arranged so that current in the brake coil will decay when the second switch is opened.

10. A method for controlling an electric motor, the method comprising:
    selecting an electric motor configured for control by a control circuit configured to control an electromechanical brake, the control circuit comprising:

a switching regulator configured to control a magnitude of voltage applied to a brake coil of the electromechanical brake, wherein said switching regulator comprises at least one semiconductor switch, one diode, one capacitor and one inductor, and wherein the control circuit is configured such that, in operation, at least one signal from a process sub-system specifies the magnitude of the voltage for the brake coil; and at least one brake applying control signal from a safety sub-system that causes the brake coil voltage to be reduced to a level that is effectively zero, thereby applying the brake by opening a switch and each brake applying control signal from the safety sub-system has a corresponding diagnostic feedback signal to the safety sub-system that indicates the state of the corresponding switch; and applying at least one control signal to cause the electromechanical brake to brake the electric motor;

wherein the switching regulator is coupled to a time-weighted feedback network whereby voltage applied to the brake coil can be varied by a control signal from a process system that specifies the time weighting of the time-weighted feedback network.

11. A system comprising an electric motor configured for control by a control circuit, the system comprising:

an electric motor configured with an electromechanical brake, the electromechanical brake in communication with the control circuit, the control circuit comprising a switching regulator configured to control a magnitude of voltage applied to a brake coil of the electromechanical brake, wherein said switching regulator comprises at least one semiconductor switch, one diode, one capacitor and one inductor, and wherein the control circuit is configured such that, in operation, at least one signal from a process sub-system specifies the magnitude of the voltage for the brake coil;

at least one brake applying control signal from a safety sub-system that causes the brake coil voltage to be reduced to a level that is effectively zero, thereby applying the brake by opening a switch and each brake applying control signal from the safety sub-system has a corresponding diagnostic feedback signal to the safety sub-system that indicates the state of the corresponding switch; and an apparatus configured to provide input to the safety sub-system and cause generation of the at least one brake applying signal;

wherein the switching regulator is coupled to a time-weighted feedback network whereby voltage applied to the brake coil can be varied by a control signal from a process system that specifies the time weighting of the time-weighted feedback network.

12. The system of claim 11, wherein the brake coil is controllable by a second, series connected, switch that is operable by a second control signal from the safety sub-system.

13. The system of claim 11, wherein the electric motor comprises one of an induction motor; a synchronous motor; a shunt motor; a separately excited motor; a series motor; a permanent magnet motor; a compounded motor; a stepper motor; a brushless DC motor; a hysteresis motor; a reluctance motor; and a universal motor.

14. The system of claim 11, configured for implementation in at least one of food and beverage; packaging and converting; pharmaceutical; material forming; medical laboratory and automation; robotics; printing; labeling; aerospace; tire and rubber; postal sorting; automated vehicles; oil and gas processing; cranes, hoist and elevators.

* * * * *